(12) United States Patent
Karoliwal et al.

(10) Patent No.: US 10,970,098 B2
(45) Date of Patent: Apr. 6, 2021

(54) METHODS FOR SHARING INPUT-OUTPUT DEVICE FOR PROCESS AUTOMATION ON A COMPUTING MACHINE AND DEVICES THEREOF

(71) Applicant: EdgeVerve Systems Limited, Bangalore (IN)

(72) Inventors: Amit Karoliwal, Pune (IN); Dipankar Roy, Pune (IN); Sachin Narhari Deshmukh, Pune (IN); Coutinho Savio Anthony, Pune (IN)

(73) Assignee: EDGEVERVE SYSTEMS LIMITED, Bangalore (IN)

( * ) Notice: Subject to any disclaimer, the term of this patent is extended or adjusted under 35 U.S.C. 154(b) by 0 days.

(21) Appl. No.: 16/556,684

(22) Filed: Aug. 30, 2019

(65) Prior Publication Data
US 2020/0073687 A1 Mar. 5, 2020

(30) Foreign Application Priority Data
Sep. 4, 2018 (IN) .............................. 201841033154

(51) Int. Cl.
  *G06F 9/455* (2018.01)
  *G06F 9/50* (2006.01)
  *G06F 11/07* (2006.01)

(52) U.S. Cl.
  CPC ........ *G06F 9/45512* (2013.01); *G06F 9/5055* (2013.01); *G06F 11/0793* (2013.01)

(58) Field of Classification Search
  CPC . G06F 9/45512; G06F 9/5055; G06F 11/0793
  See application file for complete search history.

(56) References Cited

U.S. PATENT DOCUMENTS

| | | | |
|---|---|---|---|
| 6,678,714 B1* | 1/2004 | Olapurath | G06Q 10/10 718/104 |
| 8,291,121 B2* | 10/2012 | Papadopoulos | G05B 19/4185 709/250 |
| 10,176,606 B2* | 1/2019 | Jammikunta | G06F 16/172 |
| 2014/0005803 A1* | 1/2014 | Dausend | G05B 19/0423 700/20 |
| 2014/0033091 A1* | 1/2014 | Schein | G06F 9/451 715/764 |
| 2018/0300225 A1* | 10/2018 | Topholt | G06F 11/3664 |
| 2019/0138596 A1* | 5/2019 | Singh | G06F 9/453 |

* cited by examiner

Primary Examiner — Philip Wang
Assistant Examiner — Rongfa P Wang
(74) *Attorney, Agent, or Firm* — Troutman Pepper Hamilton Sanders LLP (Rochester)

(57) ABSTRACT

Methods, non-transitory computer readable media, and resource management apparatuses that assist with sharing an input/output device for process automation on a computing machine includes receiving a plurality of surface automation requests to use an input device or an output device for surface automation. A priority is assigned to each of the received plurality of surface automation requests based on one or more characteristics associated with each of the plurality of surface automation requests. A surface automation request with a highest priority from the received plurality of surface automation requests is identified. An access to use the input device or the output device is provided to the identified surface automation request from the received plurality of surface automation requests.

18 Claims, 15 Drawing Sheets

METHODS FOR SHARING INPUT-OUTPUT DEVICE FOR PROCESS AUTOMATION ON A COMPUTING MACHINE AND DEVICES THEREOF

This application claims the benefit of Indian Patent Application Serial No. 201841033154 filed Sep. 4, 2018, which is hereby incorporated by reference in its entirety.

FIELD

This technology generally relates to methods and devices for process automation and, more particularly, to methods for sharing input/output devices for process automation on a computing machine and devices thereof.

BACKGROUND

Robotic process automation is a technology that is used to automate structured business processes. Existing automation technologies claim support for automation of target applications from access to user interface (UI) control identifiers. However, given the heterogeneity of UI technologies, existing technologies fails to effectively deploy control identifiers based automation for all applications.

As a fallback solution, automation tools allow surface automation based solutions to handle automation requirements for these applications. This allows automation process designers to design process automation using an image, by way of an example, snapshot of the target application and play mouse and keyboard interactions over specific areas of the image. At runtime the tool plays back mouse and keyboard interactions on the actual application as against target image used during automation design.

Image based automation, however, has several disadvantages including but not limited to issues due to screen resolution changes, application UI theme changes, etc. However, the most important drawback for image based automations is the constraint to have the target application in focus at the time of execution of automation process thereby severely constraining its ability to scale or execute automation processes concurrently.

SUMMARY

A method for sharing an input/output device for process automation on a computing machine includes receiving a plurality of surface automation requests to use an input device or an output device for surface automation. A priority is assigned to each of the received plurality of surface automation requests based on one or more characteristics associated with each of the plurality of surface automation requests. A surface automation request with a highest priority among the assigned priority to each of the received plurality of surface automation requests is identified. An access to use the input device or the output device is provided to the identified surface automation request from the received plurality of surface automation requests.

A non-transitory computer readable medium having stored thereon instructions for sharing an input/output device for process automation on a computing machine comprising machine executable code which when executed by at least one processor, causes the processor to receive a plurality of surface automation requests to use an input device or an output device for surface automation. A priority is assigned to each of the received plurality of surface automation requests based on one or more characteristics associated with each of the plurality of surface automation requests. A surface automation request with a highest priority among the assigned priority to each of the received plurality of surface automation requests is identified. An access to use the input device or the output device is provided to the identified surface automation request from the received plurality of surface automation requests.

A resource management apparatus including at least one of configurable hardware logic configured to be capable of implementing or a processor coupled to a memory and configured to execute programmed instructions stored in the memory to receive a plurality of surface automation requests to use an input device or an output device for surface automation. A priority is assigned to each of the received plurality of surface automation requests based on one or more characteristics associated with each of the plurality of surface automation requests. A surface automation request with a highest priority among the assigned priority to each of the received plurality of surface automation requests is identified. An access to use the input device or the output device is provided to the identified surface automation request from the received plurality of surface automation requests.

BRIEF DESCRIPTION OF THE DRAWINGS

FIG. 9 is an exemplary image illustrating a local command status indicating that the automation process is currently being performed;

DETAILED DESCRIPTION

Figure 1:
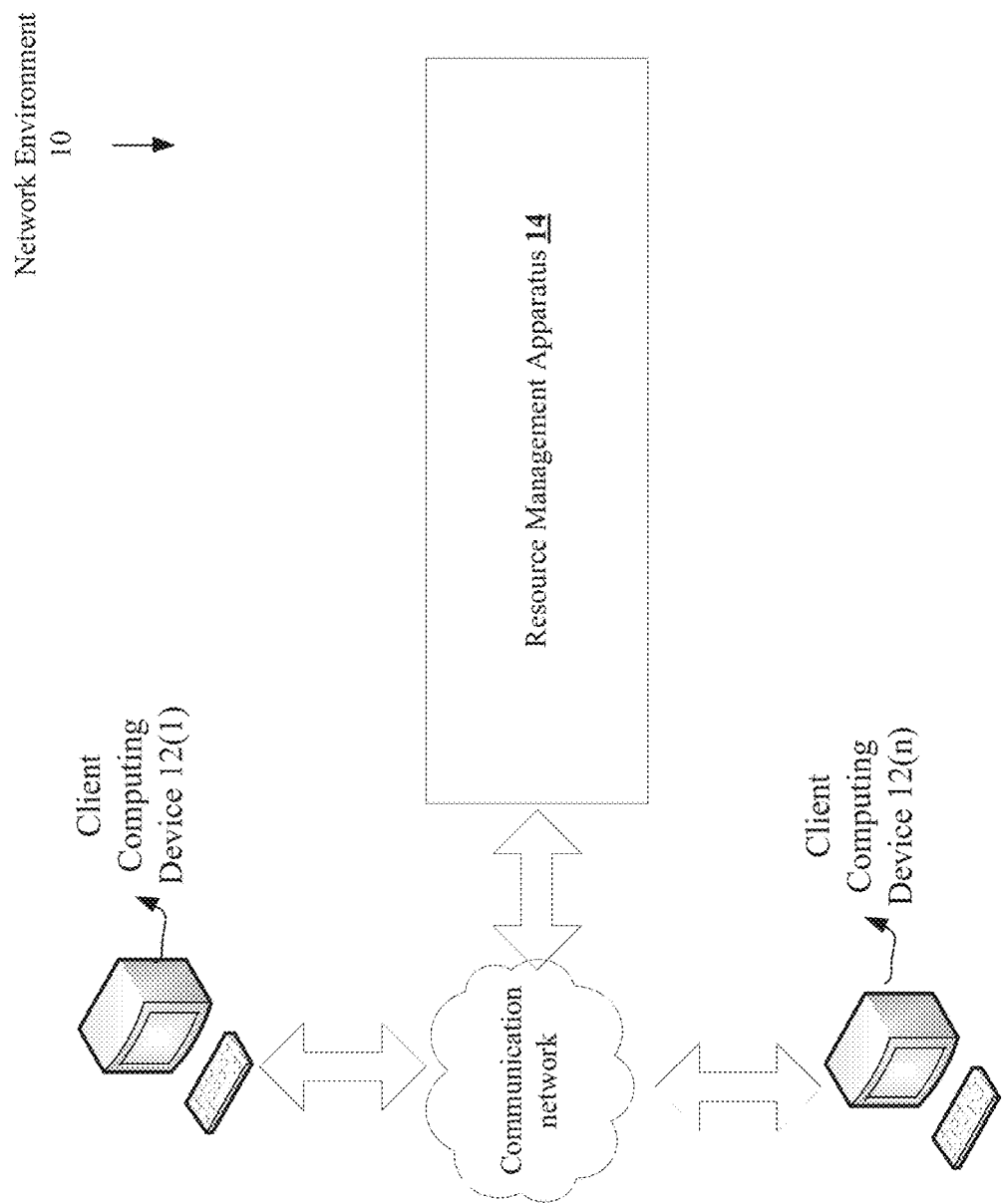
FIG. 1 is a block diagram of a network environment including an example of resource management apparatus for sharing an input/output device for process automation.
Figure 2A:
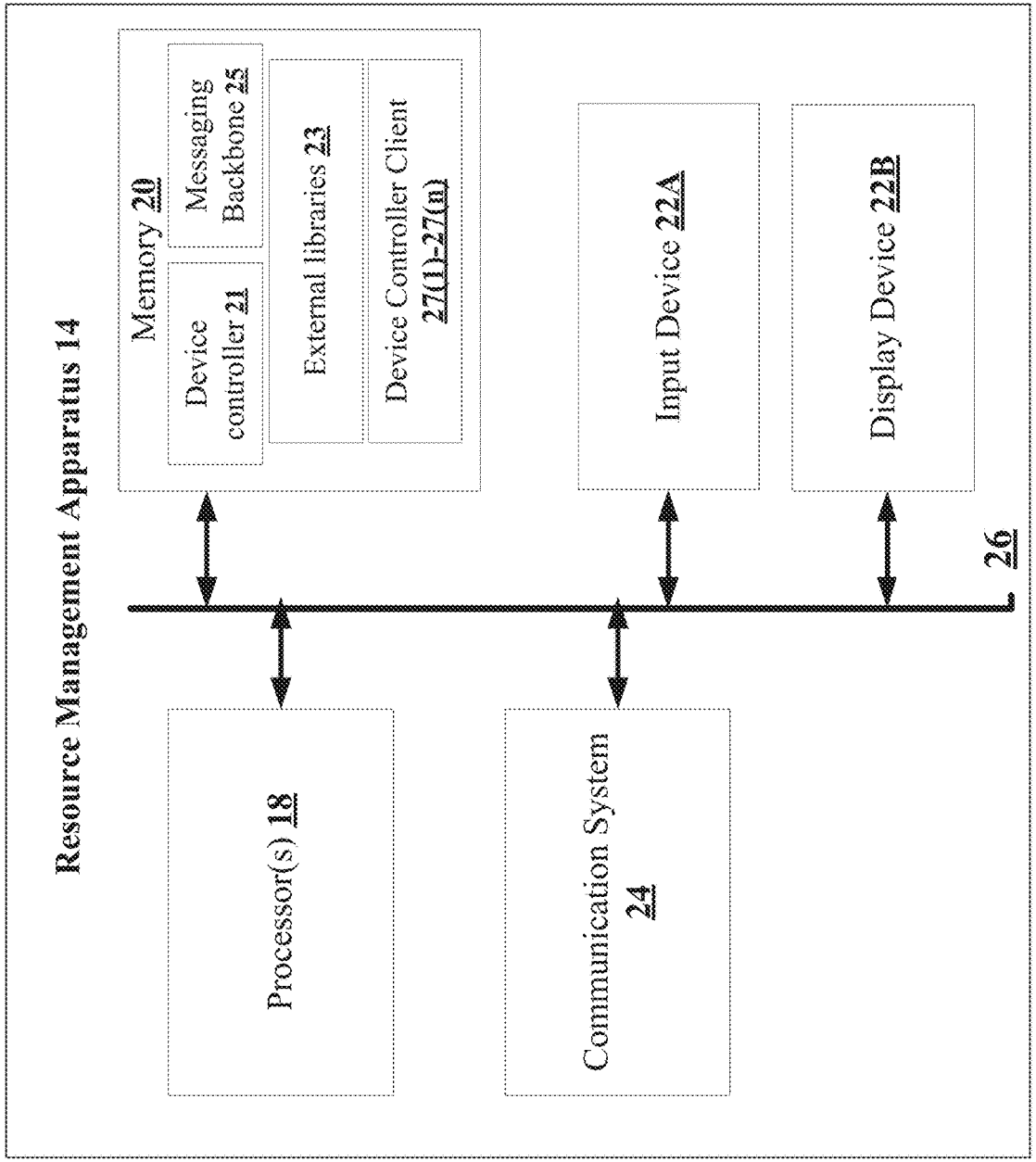
FIG. 2A-2B are exemplary block diagrams of the resource management apparatus.
Figure 2B:
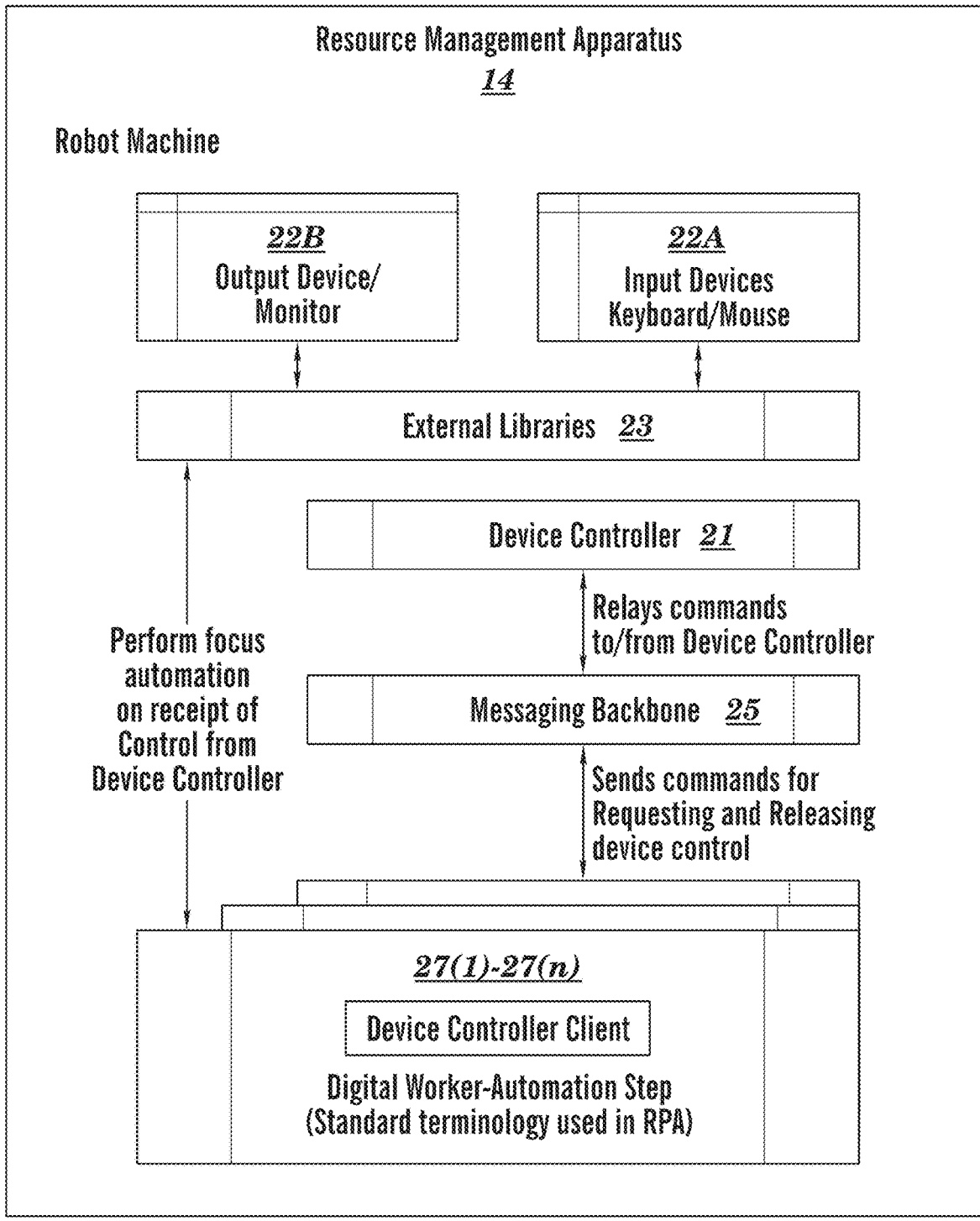
Figure 3:
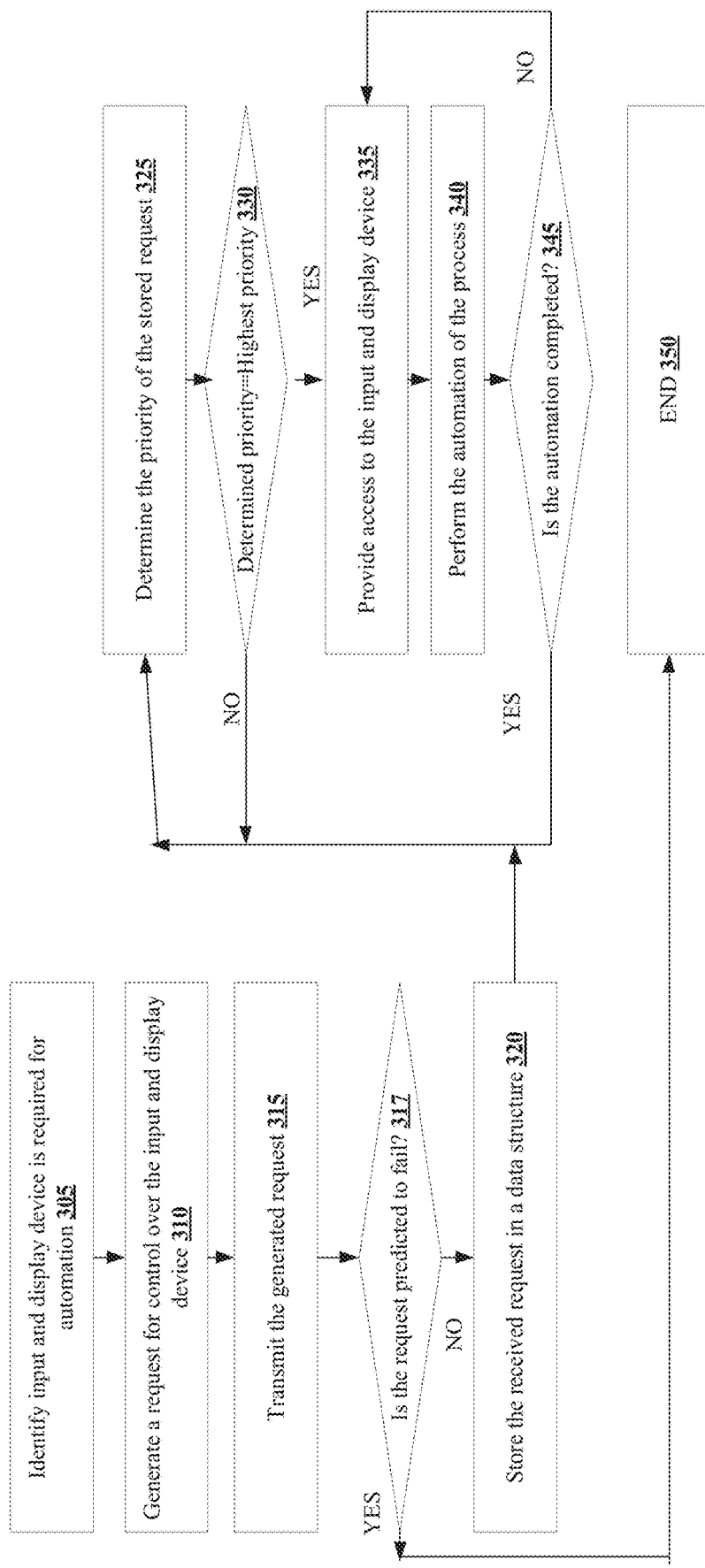
FIG. 3 is an exemplary flowchart of a method for sharing an input/output device for process automation.

A network environment 10 with an example of a resource management apparatus 14 is illustrated in FIGS. 1-2B. In this particular example, the environment 10 includes a plurality of client computing devices 12(1)-12(n) and the resource management apparatus 14 connected from a communication network, although the environment could include other types and numbers of systems, devices such as server devices, components, and/or other elements as is generally known in the art and will not be illustrated or described herein. This technology provides a number of advantages including providing methods, non-transitory computer readable medium, and apparatuses that shares input/output devices for process automation on a computing machine.

Referring more specifically to FIGS. 1-2, the resource management apparatus 14 is programmed to assist with input/output devices for process automation on a computing machine, although the apparatus can perform other types and/or numbers of functions or other operations and this technology can be utilized with other types of claims. In this particular example, the resource management apparatus 14 includes a processor 18, a memory 20, input device 22A, display device 22B, and a communication system 24 which are coupled together by a bus 26, although the resource management apparatus 14 may comprise other types and/or numbers of physical and/or virtual systems, devices, components, and/or other elements in other configurations.

The processor 18 in the resource management apparatus 14 may execute one or more programmed instructions stored in the memory 20 for sharing input/output devices for process automation on a computing machine as illustrated and described in the examples herein, although other types and numbers of functions and/or other operations can be performed. The processor 18 in the resource management apparatus 14 may include one or more central processing units and/or general purpose processors with one or more processing cores, for example.

The memory 20 in the resource management apparatus 14 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20. Additionally, as illustrated in FIGS. 2-2B, the memory 20 includes a device controller 21, a messaging backbone 25, and a plurality of device controller clients 27(1)-27(n), although the memory 20 can include other types or amounts of data. While it is illustrated that the memory 20 includes a device controller 21, a messaging backbone 25, and a plurality of device controller clients 27(1)-27(n) on a single memory device, a device controller 21, a messaging backbone 25, and a plurality of device controller clients 27(1)-27(n) can exist across one or more other memory locations on one or more other devices in other examples. In this example, the device controller 21 is configured to manage device control requests from the plurality of device controller clients 27(1)-27(n) and allocates control based on algorithms like first-in-first-out, request priority, or round-robin technique; although other types of allocation techniques can be used. Additionally, the device controller 21 assists with timeout management and fail-over and recovery of requests sent by the plurality of device controller clients 27(1)-27(n).

Additionally, as illustrated in FIGS. 2A-2B, the memory 20 includes the message backbone 25 that assists with providing a reliable communication channel between the plurality of device controller clients 27(1)-27(n) and the device controller 21. The plurality of device controller clients 27(1)-27(n), in this example, is an interface between the digital worker such as robots or automation process that requires access to screen focus and input device 22A. Additionally, in this example, the each of the plurality of device controller clients 27(1)-27(n) submits request for controlling the input device 22A and the display device 22B to device controller 21 and returns a completion status to device controller 21 after digital worker or the automation process has completed automation using input device 22A and the display device 22B. In this example, digital worker is a software process which executes automation processes and an automation process is a sequence of actions that performs a task. Digital worker can execute automation processes configured to perform different types of tasks. Additionally, the plurality of device controller clients 27(1)-27(n) has an inbuilt function to send out keep-alive requests to aid failure and recovery scenarios. Additionally, the memory 20 includes a plurality of external libraries 23 which include software libraries such as Win32 APIs, application provided interrupt libraries, and mouse or keyboard simulation libraries, although the external libraries 23 can include other types or amounts of information. In this example, these libraries 23 are provided as a part of Windows OS utilities or application utilities for performing UI interactions.

Input device 22A enables each of the plurality of digital workers associated with the plurality of device controller clients 27(1)-27(n) to automate applications, by inputting and/or viewing data and/or to configure, program and/or operate it by way of example only. By way of example only, input device 22A may include one or more of a touch screen, keyboard and/or a computer mouse.

The display device 22B enables each of the plurality of digital workers associated with the plurality of device controller clients 27(1)-27(n) to automate applications, by bringing an image in focus where the surface automation can be performed, by way of example only. By way of example only, the display device may include one or more of a CRT, LED monitor, or LCD monitor, although other types and numbers of display devices could be used.

The communication system 24 in the resource management apparatus 14 operatively couples and communicates between plurality of client computing devices 12(1)-12(n), which are all coupled together by one or more of the communication networks, although other types and numbers of communication networks or systems with other types and numbers of connections and configurations to other devices and elements. By way of example only, the communication networks can use TCP/IP over Ethernet and industry-standard protocols, including NFS, CIFS, SOAP, XML, LDAP, SCSI, and SNMP, although other types and numbers of communication networks, can be used. The communication networks in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In this particular example, each of the client computing devices 12(1)-12(n) may request or view the automation that is performed by the resource management apparatus 14, although the plurality of client computing devices 12(1)-12(n) can interact with the resource management apparatus 14 for other purposes. Each of the client computing devices 12(1)-12(n) may include a processor, a memory, user input device, such as a keyboard, mouse, and/or interactive display screen by way of example only, a display device, and a communication interface, which are coupled together by a bus or other link, although each may have other types and/or numbers of other systems, devices, components, and/or other elements.

Although the exemplary network environment 10 with the resource management apparatus 14 and the plurality of client computing devices 12(1)-12(n), is described and illustrated herein, other types and numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s). The disclosed technology can be implemented as module or components of another application. Further, the disclosed technology can be implemented as operating system extensions, module, plugins, or the like. The disclosed technology can be implemented as module or components of another application. Further, the disclosed technology can be implemented as operating system extensions, module, plugins, or the like. Even further, the disclosed technology may be operative in a cloud-based computing environment. The disclosed technology can be executed within virtual machine(s) or virtual server(s) that may be managed in a cloud-based computing environment. Also, the disclosed technology, including the resource management apparatus 14 itself, may be located in virtual server(s) running in a cloud-based computing environment rather than being tied to one or more specific physical network computing devices. Also, the disclosed technology may be running in one or more virtual machines (VMs) executing on the resource management apparatus 14. Additionally, in at least one of the various embodiments, virtual machine(s) running on the resource management apparatus 14 may be managed or supervised by a hypervisor.

Although the resource management apparatus 14 is illustrated as single device, one or more actions of the resource management apparatus 14 may be distributed across one or more distinct computing devices. Moreover, the resource management apparatus 14 is not limited to a particular configuration. Thus, the resource management apparatus 14 may contain a plurality of computing devices that operate using a master/slave approach, whereby one of the computing device of the resource management apparatus 14 operate to manage and/or otherwise coordinate operations of the other network computing devices. The resource management apparatus 14 may operate as a plurality of network computing devices within cluster architecture, a peer—to peer architecture, virtual machines, or within a cloud architecture.

Thus, the technology disclosed herein is not to be construed as being limited to a single environment and other configurations and architectures are also envisaged. For example, the resource management apparatus 14 in FIG. 1 can operate within other computing devices (not shown) rather than as a stand-alone computing device.

While the resource management apparatus 14 is illustrated in this example as including a single device, the resource management apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise resource management apparatus 14 in other examples can be standalone devices or integrated with one or more other devices or applications, for example. Moreover, one or more of the devices of the resource management apparatus 14 in these examples can be in a same or a different communication network including one or more public, private, virtual or cloud networks, for example.

One or more of the components depicted in the network environment, such as the resource management apparatus 14, for example, may be configured to operate as virtual instances on the same physical machine. In other words, the resource management apparatus 14 illustrated in FIG. 1 may operate on the same physical device rather than as separate devices communicating through a network as depicted in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 4:
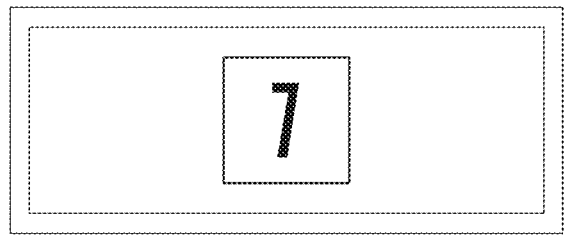
FIG. 4 is an exemplary image representing an application that is required to be automated.

An example of a method for sharing input/output devices for process automation on a computing machine will now be described with reference to FIGS. 1-12. The exemplary method begins at step 305, where the automation process (digital worker) executing within the resource management apparatus 14 may identify that the input device 22A and display device 22B are required for performing automation. By way of example, the automation process can identify a new image within memory 20 for which process automation is required to be performed and an example of such an image is illustrated in FIG. 4. Accordingly, when the automation process identifies a new image within the memory 20, the automation process can determine that the input device 22A and display device 22B are required for performing automation, although other techniques can be used to determine if the input device 22A and display device 22B are required for performing automation.

Next in step 310, the automation process within the resource management apparatus 14 may generate a request for control over the input device 22A and the display device 22B. In this example, the generated request includes data, such as the unique identification indicator associated with the requesting automation process, the date and time of the request, and a priority indicator associated with the image that has to be automated, although the generated request can include other types or amounts of data. Alternatively in another example, the automation process within the resource management apparatus 14 may initiate a call with corresponding one of the plurality of device controller clients 27(1)-27(n) to generate a request for control over the input device 22A and the display device 22B.

Figure 5:
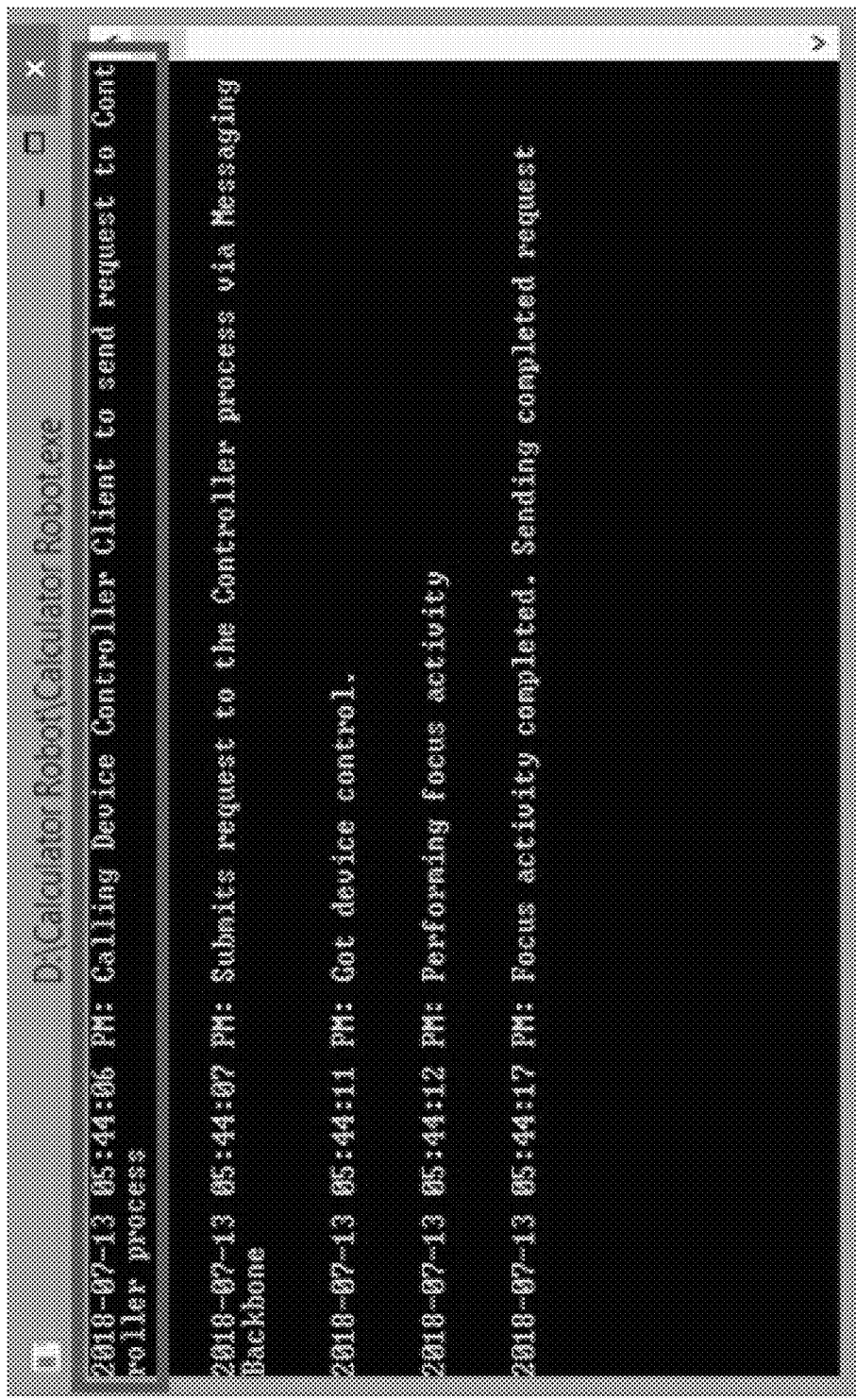
FIG. 5 is an exemplary image illustrating an automation process requesting one of the plurality of device controller clients to send the control request the device controller.
Figure 6A:
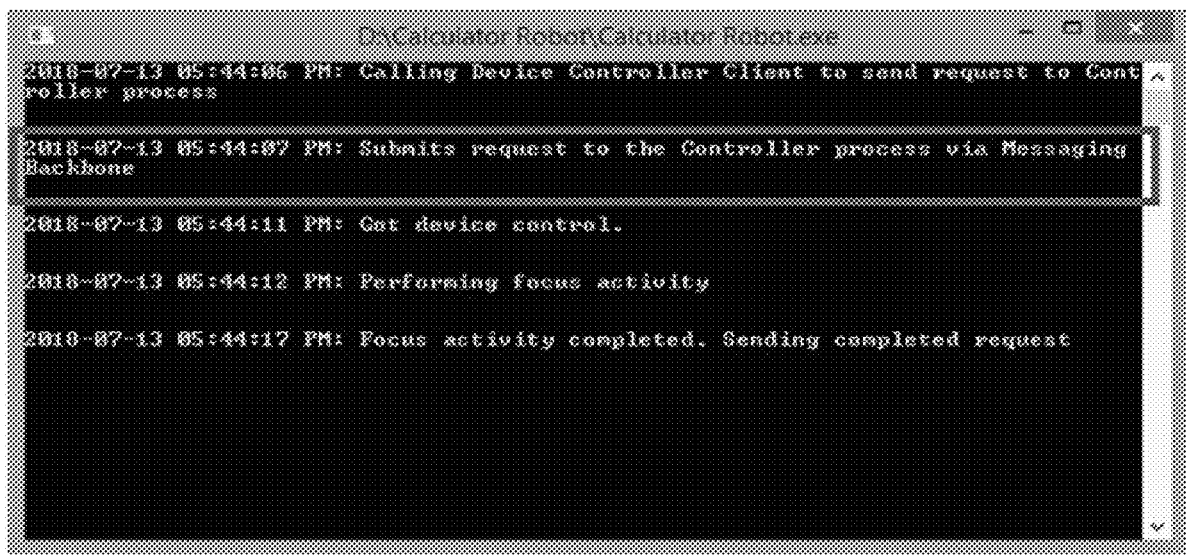
FIG. 6A is an exemplary image illustrating an automation process requesting one of the plurality of device controller clients to send the control request the device controller.

In step 315, the automation process within the resource management apparatus 14 may send the generated request to the device controller 21 using the corresponding one of the plurality of device controller clients 27(1)-27(n) from the messaging backbone 25, although the automation process can send the request to the device controller 21 using other techniques. By way of example, FIGS. 5 and 6A illustrates the automation process requesting the corresponding one of the plurality of device controller clients 27(1)-27(n) to send the control request the device controller 21. Alternatively in another example, the corresponding one of the plurality of device controller clients 27(1)-27(n) can create a transmission control protocol (TCP) socket connection with the device controller 21 and sends the control request as a TCP message to the device controller 21.

In step 317, the one of the plurality of device controller clients 27(1)-27(n) used by the automation process determine if the generated request would fail before submitting the request in the messaging backbone 25. In this example, one of the plurality of device controller clients 27(1)-27(n) can check the backlog messages and predicts if the current request will be serviced by the device controller 21 within its service legal agreement (SLA). In another example, the device controller 21 can check the backlog messages and predict if the current request will be serviced within the SLA. By way of example, the prediction can be based on current request being processed by the device controller 21, number of requests pending (whether queue is full), sum of estimated processing time of each pending request, although other types or parameters can be used while making the determination. Accordingly, if one of the device controller clients 27(1)-27(n) finds that SLA of the current request will be breached, then the Yes branch is taken to step 350 where the generated request will not be submitted, a failure notification is generated and sent to the requesting automation process and the exemplary method ends. However, if one of the device controller client 27(1)-27(n) finds that SLA of the current request will not be breached, then the No branch is taken to step 320.

Figure 6B:
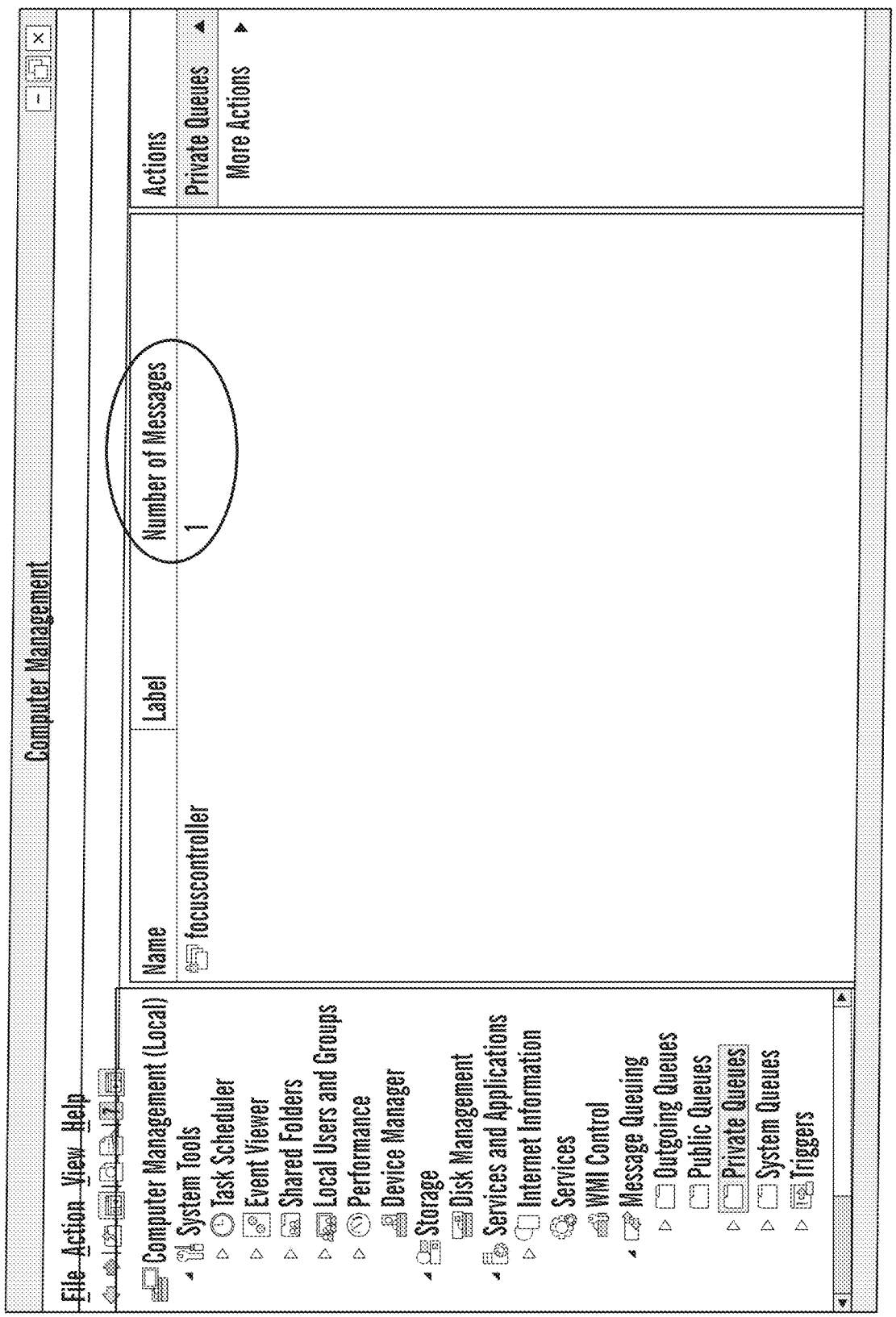
FIG. 6B is an exemplary image illustrating a messaging backbone within the resource management apparatus storing the received request within the messaging queue.

Next in step 320, the messaging backbone 25 within the resource management apparatus 14 stores the generated request within a messaging queue, although the messaging backbone 25 can store the received request in other formats of data structures including stacks, linked lists, or binary trees, and at other memory locations. By way of example, FIG. 6B illustrates the messaging backbone 25 storing the received request within the messaging queue. In another example, the generated request can be stored in a request table within a database. By way of example, the database can be an in-memory database, although other types of database could be used to store the generated requests. In yet another example, the generated request can be stored in various data stores such as database, xml file, or a csv file.

Next in step 325, the device controller 21 within the resource management apparatus 14 may determine the priority of the request that was stored in the queue. In this example, the device controller 21 can use the priority indicator in the received request and compare it to the priority of other requests within the queue to determine the actual priority of the stored request, although the device controller 21 can use other techniques to determine the priority of the request. Alternatively, in another example, the device controller 21 within the resource management apparatus 14 can compute the priority of the request stored in the queue based on the type of the requesting one of the plurality of device controller clients 27(1)-27(n) sending the request, the type of the request, the time and date of the request, and the type of application that is required to be automated, although the device controller 21 can use other types and/or numbers of parameters to determine the priority of request.

Next in step 330, the device controller 21 within the resource management apparatus 14 may determine if the determined priority of the request is the highest priority of all the requests in the queue. If the device controller 21 determines that the determined priority of the request is not the highest priority of all the requests in the queue, then the No branch is taken back to step 325 where the device controller 21 may obtain the request with the highest priority from the queue. If the device controller 21 determines that the determined priority of the request is the highest priority of all the requests in the queue, then the Yes branch is taken to step 335. Further, in this example, after determining the request with highest priority, the device controller 21 evaluates if the SLA of other requests in the queue will be breached on basis of the request selected with highest priority for processing. If the SLA of any other request in the queue is breached, such requests are marked as rejected and removed from the queue. These rejection/failure are then transmitted to the automation process by the device controller clients 27(1)-27(n).

Figure 7:
FIG. 7 is an exemplary image illustrating the device controller within the resource management apparatus granting access to the requesting one of the plurality of device controller clients.
Figure 8:
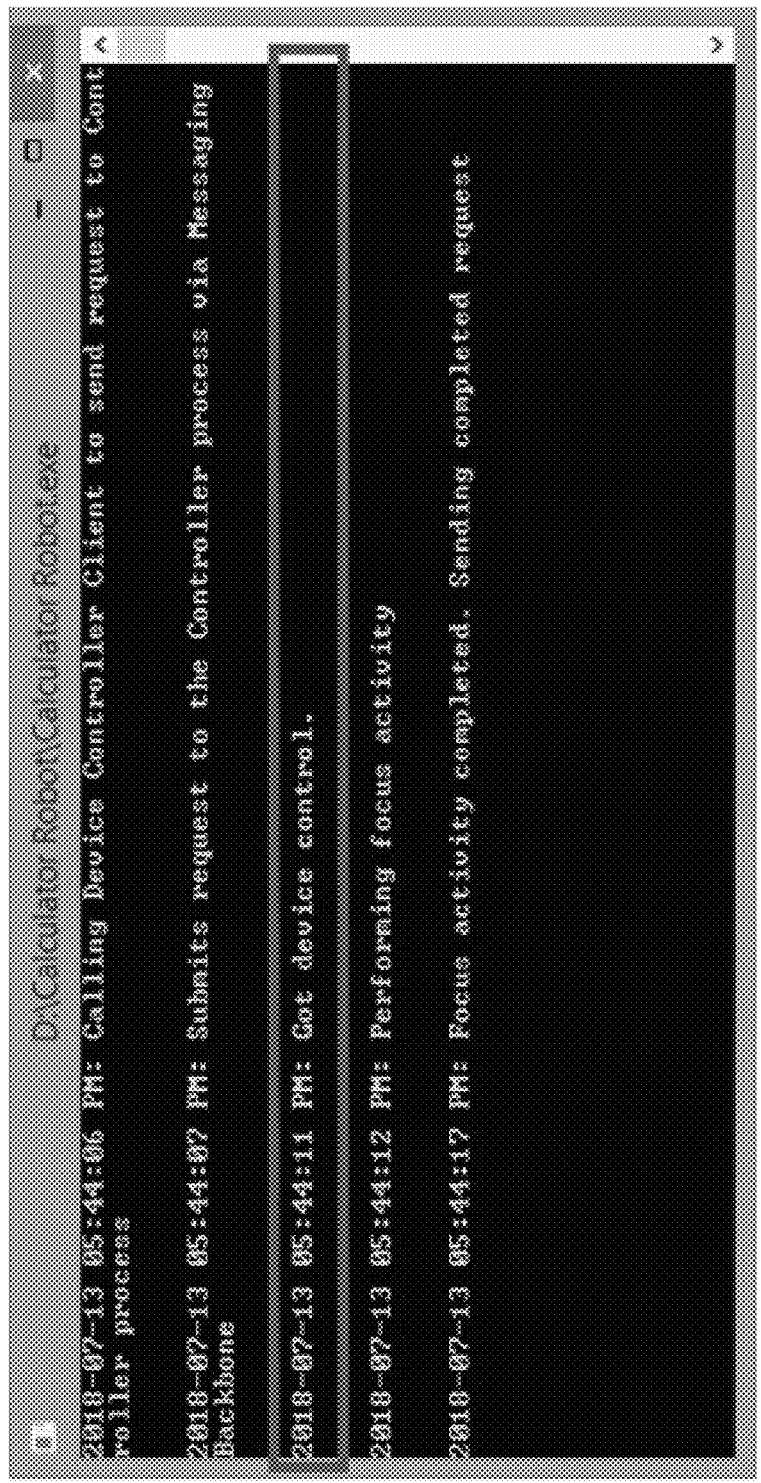
FIG. 8 is an exemplary image illustrating the device controller clients within the resource management apparatus sending an acknowledgement back to the device controller indicating successful access to the input device and the display device.

In step 335, the device controller 21 within the resource management apparatus 14 sends a message to the requesting automation process to take control of the input device 22A and the display device 22B. By way of example, FIG. 7 illustrates the device controller 21 granting access to the requesting one of the plurality of device controller clients 27(1)-27(n) and the command being displayed on the command console. Additionally in this example, the requesting automation process from one of the plurality of device controller clients 27(1)-27(n) sends an acknowledgement back to the device controller 21 indicating that access of the input device 22A and the display device 22B has been gained and an example of such acknowledgement is illustrated in FIG. 8. Alternatively in another example, the device controller 21 may send a TCP response message back to the requesting one of the plurality of device controller clients 27(1)-27(n) to take control of the input device 22A and the display device 22B. In another example, the message to take control of the input device 22A and the display device 22B can be inserted into a response row within the response table in a database.

Figure 9:
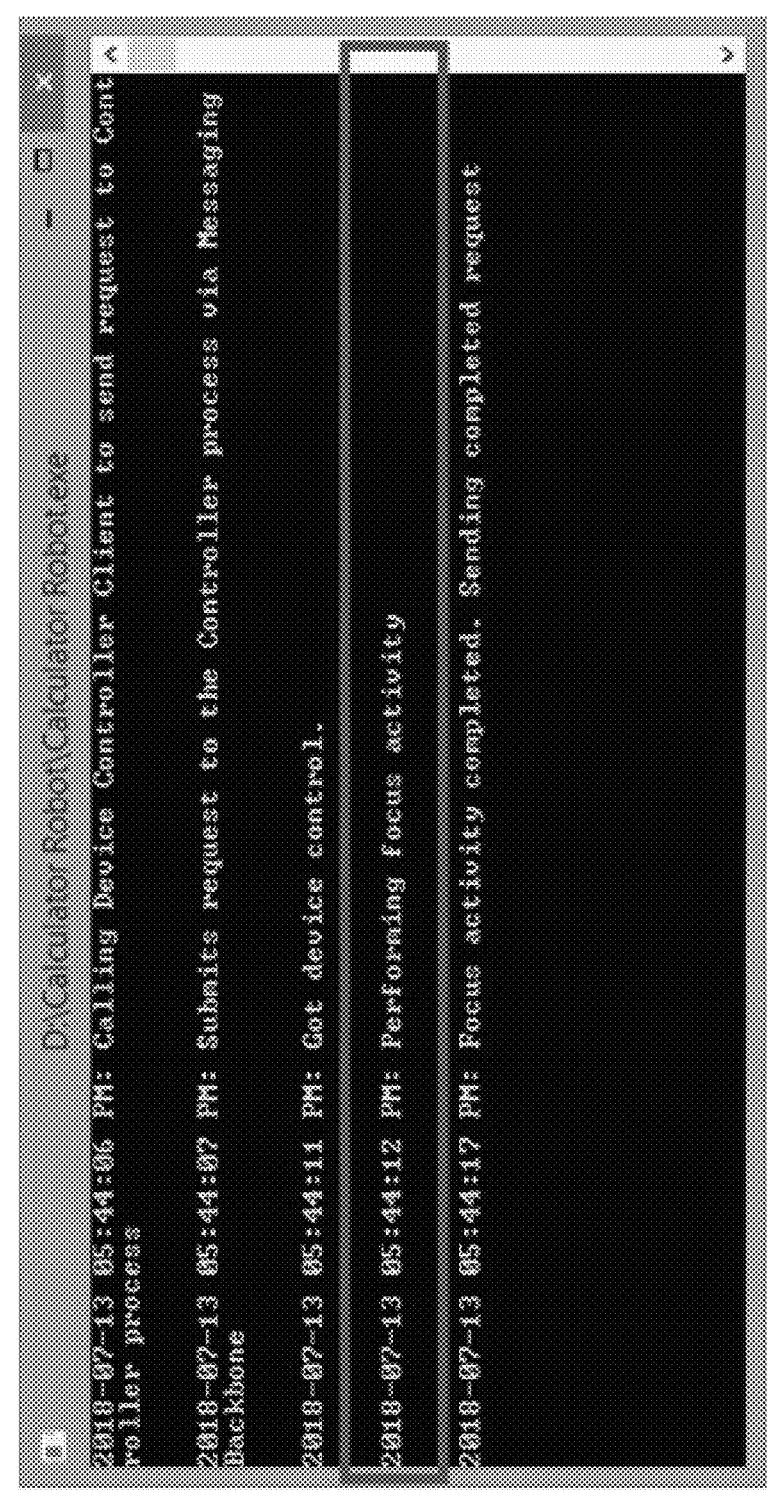
Figure 10A:
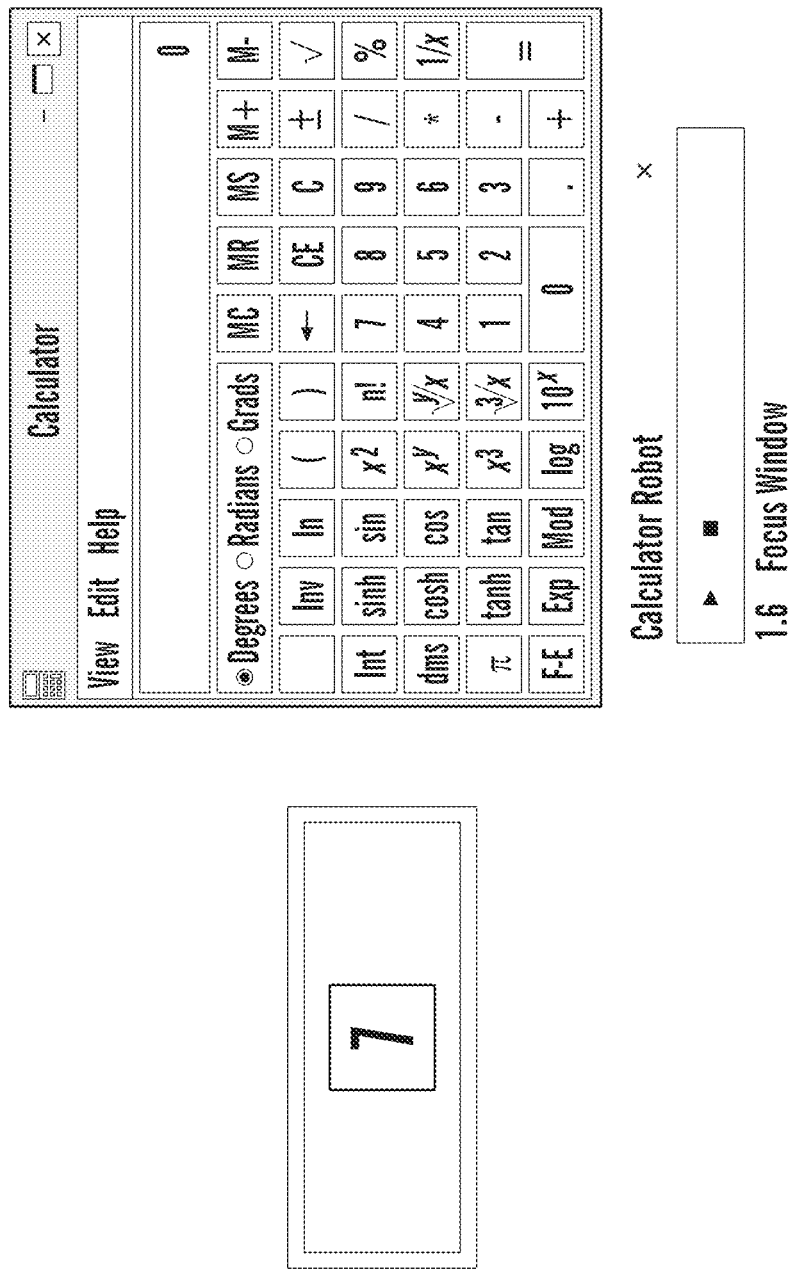
FIGS. 10A-10B are exemplary images illustrating automating the process.
Figure 10B:
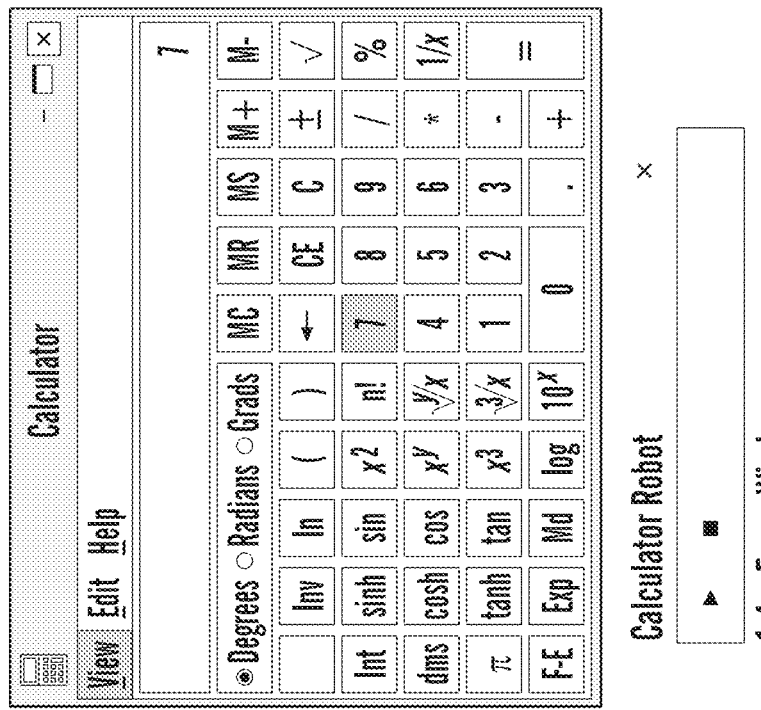

Next in step 340, requesting automation process may perform the automation of the requested application or the process. While performing the automation, one of the plurality of device controller clients 27(1)-27(n) may communicate via heart beat messages with the device controller 21 indicating that the automation is currently being performed. By way of example, a local command status indicating that the automation process is currently being performed is illustrated in FIG. 9. By way of example, requesting automation process may use the input device 22A and the display device 22B to automate the process that is present in the image that was obtained in step 305 and an example of one such automation is illustrated in FIGS. 10A-10B. In this example, the automation process uses the external libraries within the memory 20 to access the display device 22B and brings the application (calculator application, by way of example) that is required to be automated into the foreground as illustrated in FIG. 10A. Next, requesting automation process uses the input device 22B to press number seven so that the corresponding numerical value is displayed on the application. By way of example, FIG. 10B illustrates the number 7 being displayed on the calculator application. The automation that is performed using the input device 22A and the display device 22B by the automation process is based on the image that was obtained in step 305 and that image includes a screenshot of number seven being displayed on the calculator application.

Figure 11:
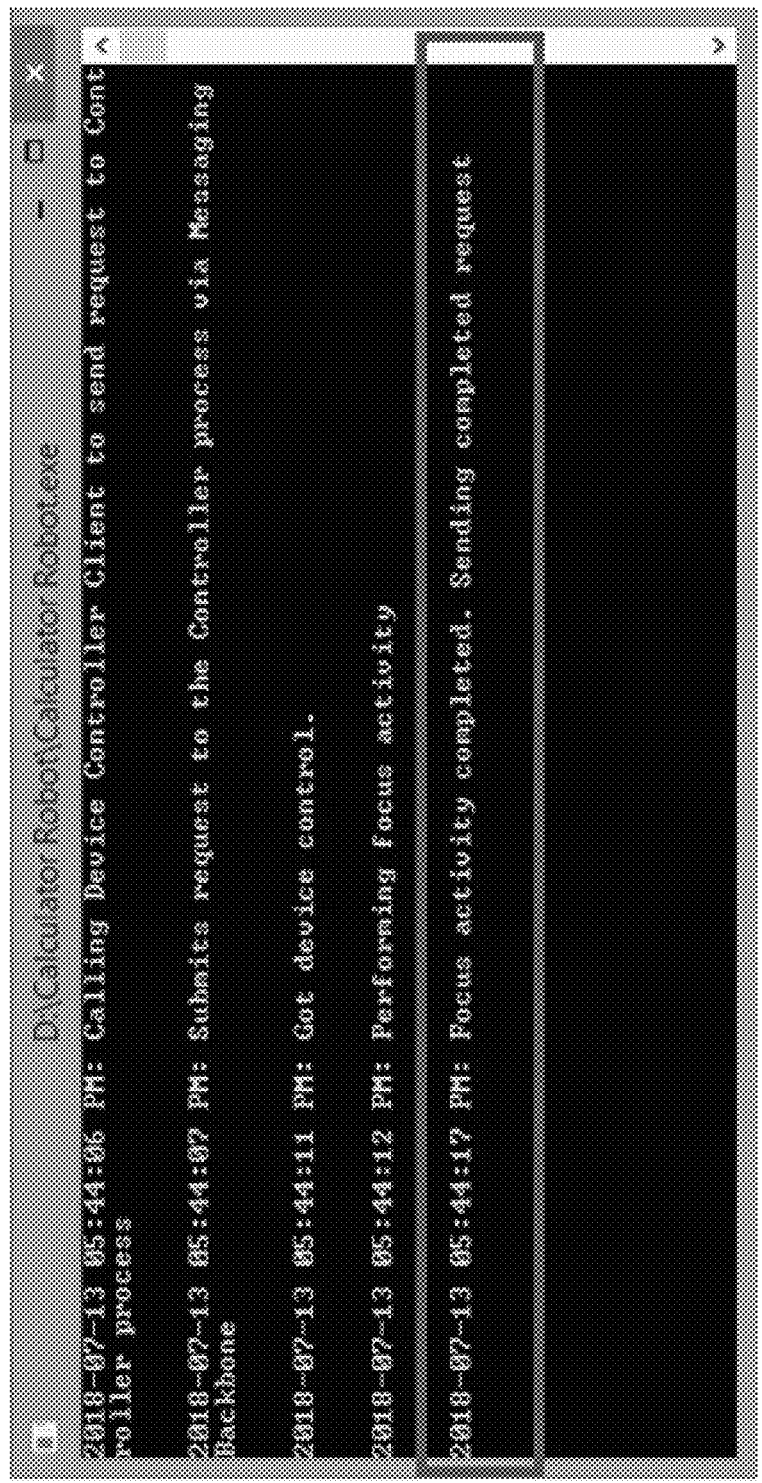
FIG. 11 is an exemplary image illustrating the device controller clients within the resource management apparatus broadcasting a message indicating that the automation has been completed.
Figure 12:
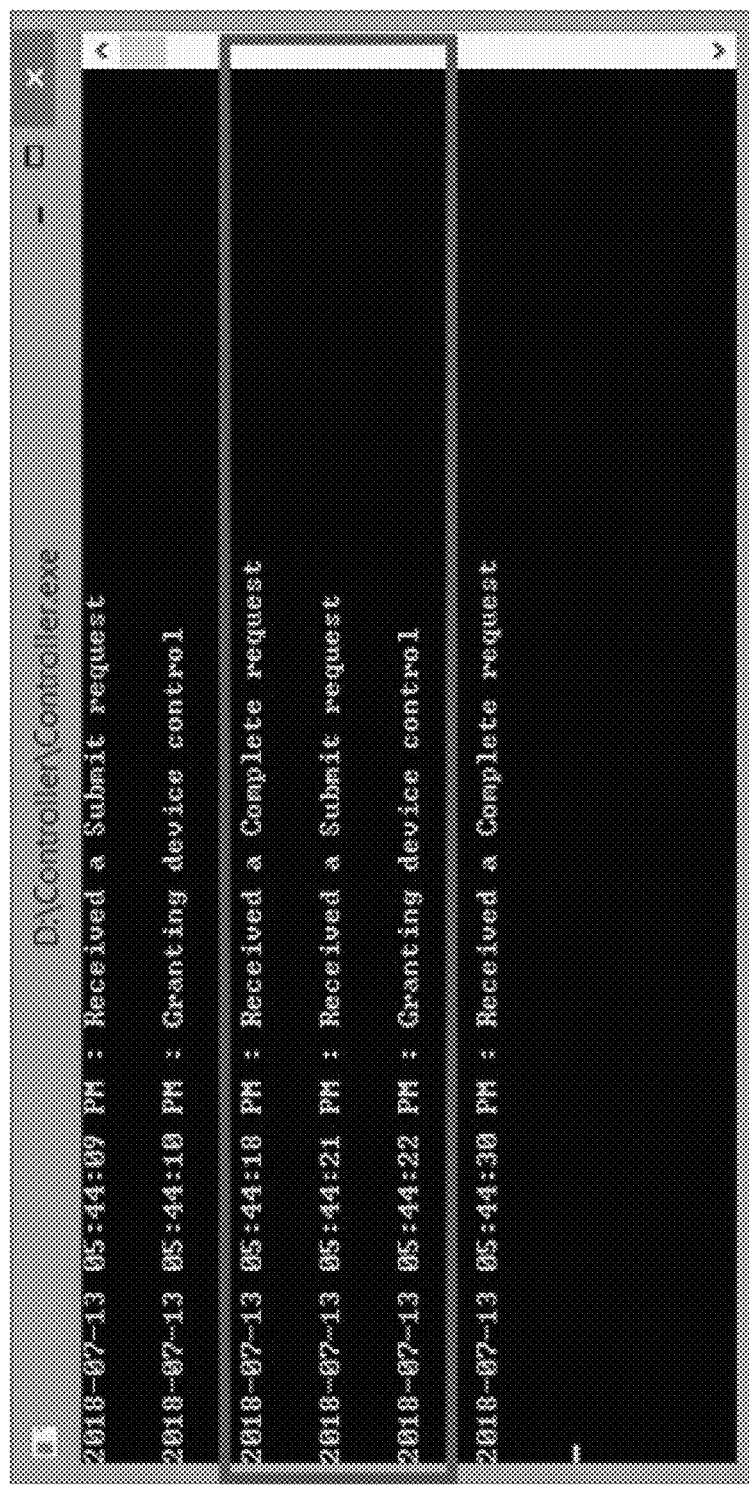
FIG. 12 is an exemplary image illustrating the device controller receiving a subsequent request with the highest priority.

Next in step 345, the device controller 21 within the resource management apparatus 14 may determine if the automation has been completed. In this example, after completing the automation, the automation process from the corresponding one of the plurality of device controller clients 27(1)-27(n) broadcasts a message indicating that the automation has been completed and an example of one such message is illustrated in FIG. 11. Accordingly, when the device controller 21 determines that the automation has not been completed, then a No branch is taken back to step 335 where the device controller 21 continues to provide the device controller client 27 access to the input device 22A and the display device 22B. However, when the device controller 21 determines that the automation has been completed, then in this example the device controller client 27 may broadcast a message indicating that the automation has been completed as illustrated in the example in FIG. 11 and then the Yes branch may be taken back to step 325 where the next request with the highest priority may be selected and then steps 330-345 described above may be repeated. An example of the device controller 21 providing access of the input device 22A and the display device 22B to the subsequent request with the highest priority is illustrated in FIG. 12. In another example, the device control client 27 can send a release control message to the device controller 21 indicating that the input device 22A and the display could be used for other automation requests. Alternatively in another example, the device controller client 27 can send the release control TCP request to the device controller 21 from the established TCP connection. In yet another example, the release control message can be placed within release control record in the request table within the database.

As illustrated and described by way of the examples herein, this technology provides a number of advantages including providing a method, non-transitory computer readable medium and apparatus that assists with method for sharing a display and an input device for process automation on a computing machine. Using the techniques illustrated above, the disclosed technology provides the ability to maximize hardware utilization on robot machine by allowing concurrent robot process execution independent of automation process type based on images. The disclosed technology allows enterprises to run multiple robots having different types of automation processes including surface user interface (UI) automation that can run in parallel on the same hardware. Further, on demand exclusive resource allocation can be provided for a given robot engine and ability to manage state for other robots competing for access to the same shared resource. The robots can request for time share for performing focus activity and perform the activity without interfering with the functionality of other robots. Furthermore, with the disclosed technology time share is supported from multiple models including but not limited to FIFO or priority etc. algorithm and this provides ability to model the system to allow priority access to shared resources to business critical processes based on enterprise use cases.

Additionally, the disclosed technology provides auto-recovery and failover where the device controller 21 auto recovers if the controller process fails or is accidentally killed. In this example, an instance of the device controller 21 is created by a robot when it requires to communicate with the device controller 21. However, before creating an instance of device controller 21, robot checks if an instance already exists. If an instance of device controller 21 is already running then, the robot does not create a new instance but communicates with the existing instance of device controller 21. By using this technique, only one instance of device controller 21 is available on a single machine. Given this a device controller 21 avoids becoming a single point of failure, the disclosed technology provides for a mechanism to handle automatic recovery and failover. The mechanism of automatic recovery and failover is explained below via a representative scenario. By way of example, if there are two robots (Robot 1 and Robot 2) performing automation and Robot 1 requires the input/output device control to perform surface automation. So, Robot 1 creates an instance of device controller 21, requests for device control and gets control. However, if user by mistake kills the device controller 21 via Windows Task Manager, by way of example, there could be 2 possible scenarios now: Once Robot 1 completes its automation and releases control, it will detect that the device controller 21 process does not exist and will create a new instance again. In the second possible scenario, while Robot 1 is performing automation, Robot 2 needs input/output device control to perform surface automation for a parallel request. As no instance of device controller 21 is running, Robot 2 create a new instance of device controller 21 and requests for output device control. The device controller 21 while starting, reads all existing requests from the messaging backbone and learns that Robot 1 is already having the control. So the device controller 21 queues the request from Robot 2 till Robot 1 releases its control. By using this technique, the device controller 21 auto-recover and handles its failover.

The disclosed technology also provides advantages of reliably handling a scenario where a request after receiving access to shared resource goes into an error or unrecoverable state. A request timeout is built in device controller 21 to move the request to error if the request fails to relinquish control after giving time period or heartbeat is not sent to the controller. Once a request is ascertained to be in error condition the device controller 21 passes on control to the next request waiting for access based on the priority. Furthermore, the technology also predicts if an incoming request for exclusive resource access will fail due to existing workload on the controller. This allows requests to fail-fast and allow graceful exception handling of the automation process.

In this example, once the robots receive control of input/output device, it starts performing its automation. While performing its automation (i.e. when the robot has device control), robot simultaneously sends heartbeat to the device controller 21 at preconfigured interval. In case the heartbeat are not being received, the device controller 21 assumes the robot has entered into an error state and it revokes the access of robot to the input/output device. The device controller 21 then selects the next available highest priority request to grant control. Along with granting the control of input/output device to a robot, the device controller 21 also monitors the time period for which control is granted to a robot. A pre-configured set of rules are used by the device controller 21 to monitor the time for which the robot is given the access. By way of example, the preconfigured rules can be but not limited to any/any combination of the following logic: a maximum timeout period set at device controller 21, which is same for all robots; and each robot while requesting the control of input/output device can communicate the time period for which it requires access to input/output devices.

If the access to the input/output device is not relinquished at the end of the time period, the device controller 21 checks if the heartbeats are being received from the robot. If the heartbeats are not being received, the device controller 21 assumes the robot has entered into an error state and it revokes the access of robot to the input/output device. The device controller 21 then selects the next available highest priority request to grant control. In case the heartbeats are being received from the robot by the device controller 21, the time for access to the input/output device is increased by a specific time period.

In case the access to the input/output device is not relinquished by the robot at the end of the extended time period, device controller 21 checks if the heartbeats are being received from the robot. If the heartbeats are being received, the time for access to the input/output device is increased by the specific time period again. The extension of the time period for access of the input/output device is performed only for a pre-determined number of times. If the robot has not released the control of the input/output device even after pre-determined number of extensions then the device controller 21 assumes the robot has entered into an error state and it revokes the access of robot to the input/output device. The device controller 21 then selects the next available highest priority request to grant control. By way of example, if there are two robots (Robot 1 and Robot 2) performing automation and Robot 1 need output device control to perform surface automation. In this example, Robot 1, requests for device control and gets control. However, Robot 1 is not sending processing heartbeat to the device controller 21 because the application to be automated has hanged, or robot enters into an error state. Next, Robot 2 also needs output device control to perform surface automation and Robot 2 requests for input/output device control and waits for control. Device Controller 21 queues the request from Robot 2 till Robot 1 releases its control. Once Timeout period is reached in device controller 21 checks the time the latest heartbeat message is sent by Robot 1. If device controller 21 does not find any heartbeat from Robot 1, it revokes the access of Robot 1 to the input/output device and grants the control of the input/output device to Robot 2. Finally, once control is received by Robot 2, it performs automation.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   receiving, by a device controller, a plurality of surface automation requests to control an input device or an output device for surface automation following identification, by one or more automation processes, of one or more images stored in a memory and associated with the surface automation;
   determining, by the device controller in response to the received surface automation requests and the identification of the one or more images, the input device or the output device is required for performing the surface automation;
   assigning, by the device controller, a priority to each of the received surface automation requests based on one or more characteristics associated with each of the received surface automation requests;
   identifying, by the device controller, one of the received surface automation requests with a highest priority; and
   providing, by the device controller, access to use the input device or the output device to the identified one of the received surface automation requests.

2. The method as set forth in claim 1, further comprising identifying, by the device controller, one or more of the received surface automation requests that are predicted to fail prior to completing the surface automation, wherein the one or more of the received surface automation requests are identified prior to assigning the priority to each of the received surface automation requests.

3. The method as set forth in claim 2, further comprising rejecting, by the device controller, access to use the input device or the output device to the identified one or more of the received surface automation requests that are predicted to fail.

4. The method as set forth in claim 1, wherein the one or more characteristics comprise one or more priority indicators associated with one or more of the one or more images.

5. The method as set forth in claim 1, further comprising recovering, by the device controller, from a failover event without interrupting the surface automation, wherein the failover event is identified during execution of the surface automation.

6. The method as set forth in claim 1, further comprising:
   identifying, by the device controller, a request timeout period for completing the surface automation; and
   assigning, by the device controller, the input device or the output device to a subsequent automation process request with the highest priority when the identified surface automation request fails to complete within the identified request timeout period.

7. A non-transitory computer readable medium having stored thereon instructions for sharing an input and an output device for process automation comprising executable code, which when executed by at least one processor, causes the processor to:
   receive a plurality of surface automation requests to control an input device or an output device for surface automation following identification, by one or more automation processes, of one or more images stored in a memory and associated with the surface automation;
   determine, in response to the received surface automation requests and the identification of the one or more images, the input device or the output device is required for performing the surface automation;

assign a priority to each of the received surface automation requests based on one or more characteristics associated with each of the received surface automation requests;

identify one of the received surface automation requests with a highest priority; and provide access to use the input device or the output device to the identified one of the received surface automation requests.

8. The non-transitory computer readable medium as set forth in claim 7, wherein the executable code, when executed by the processor, further causes the processor to identify one or more of the received surface automation requests that are predicted to fail prior to completing the surface automation, wherein the one or more of the received surface automation requests are identified prior to assigning the priority to each of the received surface automation requests.

9. The non-transitory computer readable medium as set forth in claim 8, wherein the executable code, when executed by the processor, further causes the processor to reject access to use the input device or the output device to the identified one or more of the received surface automation requests that are predicted to fail.

10. The non-transitory computer readable medium as set forth in claim 7, wherein the one or more characteristics comprise one or more priority indicators associated with one or more of the one or more images.

11. The non-transitory computer readable medium as set forth in claim 7, wherein the executable code, when executed by the processor, further causes the processor to recover from a failover event without interrupting the surface automation, wherein the failover event is identified during execution of the surface automation.

12. The non-transitory computer readable medium as set forth in claim 7, wherein the executable code, when executed by the processor, further causes the processor to:

identify a request timeout period for completing the surface automation; and assign the input device or the output device to a subsequent automation process request with the highest priority when the identified surface automation request fails to complete within the identified request timeout period.

13. A resource management apparatus, comprising:

a memory comprising programmed instructions stored thereon; and at least one processor coupled to the memory and configured to execute the stored programmed instructions to:

receive a plurality of surface automation requests to control an input device or an output device for surface automation following identification, by one or more automation processes, of one or more images stored in a memory and associated with the surface automation;

determine, in response to the received surface automation requests and the identification of the one or more images, the input device or the output device is required for performing the surface automation;

assign a priority to each of the received surface automation requests based on one or more characteristics associated with each of the received surface automation requests;

identify one of the received surface automation requests with a highest priority; and provide access to use the input device or the output device to the identified one of the received surface automation requests.

14. The resource management apparatus as set forth in claim 13, wherein the processor is further configured to execute the stored programmed instructions to identify one or more of the received surface automation requests that are predicted to fail prior to completing the surface automation, wherein the one or more of the received surface automation requests are identified prior to assigning the priority to each of the received surface automation requests.

15. The resource management apparatus as set forth in claim 14, wherein the processor is further configured to execute the stored programmed instructions to reject access to use the input device or the output device to the identified one or more of the received surface automation requests that are predicted to fail.

16. The resource management apparatus as set forth in claim 13, wherein the one or more characteristics comprise one or more priority indicators associated with one or more of the one or more images.

17. The resource management apparatus as set forth in claim 13, wherein the processor is further configured to execute the stored programmed instructions to recover from a failover event without interrupting the surface automation, wherein the failover event is identified during execution of the surface automation.

18. The resource management apparatus as set forth in claim 13, wherein the processor is further configured to execute the stored programmed instructions to:

identify a request timeout period for completing the surface automation; and assign the input device or the output device to a subsequent automation process request with the highest priority when the identified surface automation request fails to complete within the identified request timeout period.

* * * * *